United States Patent
Boesen et al.

(10) Patent No.: US 10,667,033 B2
(45) Date of Patent: May 26, 2020

(54) MULTIFACTORIAL UNLOCKING FUNCTION FOR SMART WEARABLE DEVICE AND METHOD

(71) Applicant: BRAGI GmbH, München (DE)

(72) Inventors: Peter Vincent Boesen, München (DE); Veniamin Milevski, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/443,244

(22) Filed: Feb. 27, 2017

(65) Prior Publication Data

US 2017/0257698 A1    Sep. 7, 2017

Related U.S. Application Data

(60) Provisional application No. 62/302,275, filed on Mar. 2, 2016.

(51) Int. Cl.
H04R 1/10 (2006.01)
G10L 17/00 (2013.01)

(52) U.S. Cl.
CPC .......... H04R 1/1091 (2013.01); G10L 17/005 (2013.01); H04R 1/1016 (2013.01); H04R 2420/07 (2013.01)

(58) Field of Classification Search
None
See application file for complete search history.

(56) References Cited

U.S. PATENT DOCUMENTS

| | | | |
|---|---|---|---|
| 3,934,100 A | 1/1976 | Harada | |
| 4,150,262 A | 4/1979 | Ono | |
| 4,334,315 A | 6/1982 | Ono et al. | |
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |

(Continued)

FOREIGN PATENT DOCUMENTS

| | | |
|---|---|---|
| CN | 204244472 U | 4/2015 |
| CN | 104837094 A | 8/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Fan S Tsang
(74) *Attorney, Agent, or Firm* — Goodhue, Coleman & Owens, P.C.

(57) ABSTRACT

A system, method and one or more wireless earpieces for authenticating functionality of one or more wireless earpieces. A request that requires authentication is received through the one or more wireless earpieces. Biometric readings are performed for a user utilizing sensors of the one or more wireless earpieces. The biometric readings are analyzed to determine whether the user is authorized for the one or more wireless earpieces to fulfill the request. The request is authenticated in response to determining the biometric readings performed by the one or more wireless earpieces authorize fulfillment of the request.

20 Claims, 4 Drawing Sheets

(56) References Cited

U.S. PATENT DOCUMENTS

| | | | |
|---|---|---|---|
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 8,994,498 B2 | 3/2015 | Agrafioti et al. | |
| 9,081,944 B2 | 7/2015 | Camacho et al. | |
| 9,510,159 B1 | 11/2016 | Cuddihy et al. | |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0002705 A1 | 1/2003 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2008/0146890 A1 | 6/2008 | LeBoeuf et al. | |
| 2008/0254780 A1 | 10/2008 | Kuhl et al. | |
| 2009/0292927 A1* | 11/2009 | Wenzel | G06F 21/41 713/185 |
| 2010/0075631 A1* | 3/2010 | Black | H04M 1/05 455/410 |
| 2013/0303869 A1* | 11/2013 | Rebec | A61B 5/14532 600/365 |
| 2014/0143551 A1* | 5/2014 | Rothschild | G06F 21/602 713/189 |
| 2015/0028996 A1 | 1/2015 | Agrafioti et al. | |
| 2016/0033280 A1 | 2/2016 | Moore et al. | |
| 2016/0353195 A1* | 12/2016 | Lott | H04R 1/1041 |
| 2017/0215011 A1* | 7/2017 | Goldstein | H04R 25/305 |

FOREIGN PATENT DOCUMENTS

| | | |
|---|---|---|
| EP | 1017252 A2 | 7/2000 |
| GB | 2074817 | 4/1981 |
| JP | 06292195 | 10/1998 |
| WO | 2007034371 A3 | 11/2008 |
| WO | 2012071127 A1 | 5/2012 |
| WO | 2013134956 A1 | 9/2013 |
| WO | 2014043179 A2 | 3/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI is on Facebook (2014).

BRAGI Update—Arrival of Prototype Chassis Parts—More People—Awesomeness (May 13, 2014).

BRAGI Update—Chinese New Year, Design Verification, Charging Case, More People, Timeline(Mar. 6, 2015).

BRAGI Update—First Sleeves From Prototype Tool—Software Development Kit (Jun. 5, 2014).

BRAGI Update—Let's Get Ready to Rumble, a Lot to Be Done Over Christmas (Dec. 22, 2014).

BRAGI Update—Memories From April—Update on Progress (Sep. 16, 2014).

BRAGI Update—Memories from May—Update on Progress—Sweet (Oct. 13, 2014).

BRAGI Update—Memories From One Month Before Kickstarter—Update on Progress (Jul. 10, 2014).

BRAGI Update—Memories From the First Month of Kickstarter—Update on Progress (Aug. 1, 2014).

BRAGI Update—Memories From the Second Month of Kickstarter—Update on Progress (Aug. 22, 2014).

(56) References Cited

OTHER PUBLICATIONS

BRAGI Update—New People © BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Hyundai Motor America, "Hyundai Motor Company Introduces a Health + Mobility Concept for Wellness in Mobility", Fountain Valley, Californa (2017).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

US 10,667,033 B2

MULTIFACTORIAL UNLOCKING FUNCTION FOR SMART WEARABLE DEVICE AND METHOD

PRIORITY STATEMENT

This application claims priority to U.S. Provisional Patent Application 62/302,275, filed on Mar. 2, 2016, and entitled Multifactorial unlocking function for smart wearable device and method, hereby incorporated by reference in its entirety.

BACKGROUND

I. Field of the Disclosure

The illustrative embodiments relate to wireless earpieces. More specifically, but not exclusively, the illustrative embodiments relate to fulfilling requests received through the wireless earpieces utilizing biometric readings taken by the wireless earpieces.

II. Description of the Art

The growth of wearable wireless devices is increasing exponentially. This growth is fostered by the decreasing size of transceivers, chips, and other components as well as enhanced computing and communications standards and protocols. Securing actions performed by the wearable devices and data and information available through the wearable devices continues to be a concern. These concerns are legitimate based on the small and transportable nature of the wearable devices as well as the large amount of personal information and data that the wearable devices may generate and store.

SUMMARY OF THE DISCLOSURE

One embodiment provides a system, method and one or more wireless earpieces for authenticating functionality of one or more wireless earpieces. A request that requires authentication is received through the one or more wireless earpieces. Biometric readings are performed for a user utilizing sensors of the one or more wireless earpieces. The biometric readings are analyzed to determine whether the user is authorized for the one or more wireless earpieces to fulfill the request. The request is authenticated in response to determining the biometric readings performed by the one or more wireless earpieces authorize fulfillment of the request. Another embodiment provides wireless earpieces including a processor and a memory storing a set of instructions. The set of instructions are executed to perform the method described.

Another embodiment provides a wireless earpiece. The wireless earpiece includes a frame for fitting in an ear of a user. The wireless earpiece further includes a logic engine controlling functionality of the wireless earpiece. The wireless earpiece further includes a number of sensors taking biometric readings of the user. The logic engine receives a request that requires authentication through the one or more wireless earpieces, performs biometric readings for the user utilizing sensors of the wireless earpiece, authenticates the request based on the biometric readings, and authorizes fulfillment of the request.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
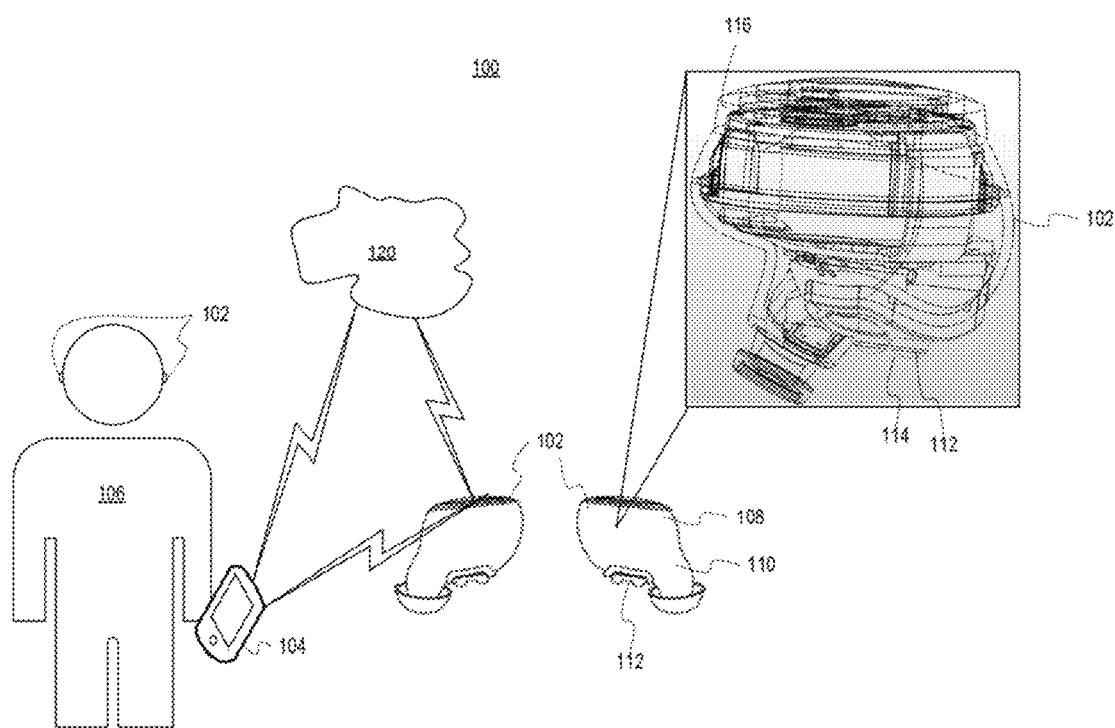
FIG. 1 is a pictorial representation of a communications environment in accordance with an illustrative embodiment.

The illustrative embodiments provide a system, method, and wireless earpieces for unlocking functionality of the wireless earpieces. The wireless earpieces provide access to data, features, and functions of the wireless earpieces or externally connected devices. The access may be granted in response to an automatic or user-generated request. The user may be identified and one or more passwords or secure identifiers may be used to authenticate the request.

The wireless earpieces represent a smart wearable device that may be worn within the ears of the user. As with all personal devices, the wireless earpieces may store valuable personal information including name, address, age, sex, user preferences, user biometrics, user financial information for implementing transactions (e.g., debit/credit card numbers, account numbers, user names, passwords, pins), and other sensitive personal information. The wireless earpieces include a number of sensors that may be configured to read biometric information associated with the user. The wireless earpieces may also receive user input from the user including gestures, voice commands, motions, taps, swipes, or other forms of feedback. The biometric information may include heart rate or pattern including heart rate variability, fingerprints, mapping of the user's ear/head, voice analysis, skin conductivity, height determinations, and so forth. The biometric readings or information may also be stored for any number of purposes including health monitoring, identification, tracking, and so forth.

The wireless earpieces may include a multifactorial access system that may include preprogrammed passwords, pin numbers, biometric information, verbal indicators, or password combinations that may be required as access information to unlock specific information, data, functionality, actions, or features of the wireless earpieces. For example, sequential, simultaneous, or concurrent biometric readings or user input may be required to unlock specified data, functions, or so forth. In another embodiment, the user may program the multifactorial access of the wireless earpieces. For example, an external interface available through a wireless device may be utilized to set the multifactorial access requirements for data, functionality, or other requests. As a result, the access to sensitive information may be partitioned or sandboxed to prevent unauthorized or inadvertent access. The access information may be received directly by the wireless earpieces or from an external device location with the wireless earpieces directly through a connection (e.g., Wi-Fi, Bluetooth, NFMI, etc.) or through one or more networks.

The illustrative embodiments may allow a user to loan the wireless earpieces to another user without concern for breaching or contamination of their own unique personal biometric or private data. In one embodiment, the primary or administrative user may establish profiles for any number of users that may utilize a single set of wireless earpieces or single wireless earpiece. For example, the primary user may control the user profiles of the secondary users. Multifactorial access to data may also be set for the secondary users as allowed by the primary user. As a result, any number of users may be able to control and manage access to different data, functions, and so forth available through the wireless earpieces.

In one embodiment, the wireless earpieces may work in combination with a dynamic or static wireless device, such as a cell phone, smart card, smart wearable (e.g., watch, eyeglass(es), ring, jewelry item, article of clothing, etc.), radio frequency identification tag, or so forth. The wireless earpieces are worn in the ear of the user. In response to an automatic or user-generated request, the wireless earpieces may be utilized to perform any number of authentication actions. The wireless earpieces or other connected devices may store standard measurements or norms for comparison purposes such as may be collected during an initial setup process. As a result, the biometric readings may be analyzed to perform comparisons to authenticate the biometric readings. The biometric readings may also indicate the user's physical or emotional state as determined using biometric information, sensed information, and other information and data about the user or the user's environment to ensure that the request should be fulfilled. The biometric readings of the user may be determined from a pair of wireless earpieces or a single wireless earpiece worn by the user. The description included herein may refer to the wireless earpieces individual or collectively.

The wireless earpieces are configured to fit at least partially into an external auditory canal of the user. The earpieces may be partially in the canal, fully in the canal, may be behind-the-ear, or may be implemented as a set of head phones or headset. The ear canal is a rich space for obtaining biometric measurements about the user as well as stabilizing the wireless earpieces as they are worn. The wireless earpieces may be utilized during a number of rigorous physical activities that require stability. The shape and configuration of the wireless earpieces allow the wireless earpieces to be worn for long periods of time while gathering valuable information utilizing the sensors of the wireless earpieces. The wireless earpieces may include sensors for measuring pule rate, blood oxygenation, microphone, position/orientation, location, temperature, altitude, cadence, calorie expenditure, and so forth.

The wireless earpieces may include any number of sensor arrays configured to capture information about the user. The large amount of data may be utilized to authenticate the user for any number of request. The wireless earpieces may configure themselves to perform various functions as well as sending commands to any number of proximate devices to implement actions, commands, or transactions. The wireless earpieces may learn over time in response to selections made utilizing the wireless earpieces or interconnected devices, such as a cell phone. The sensors may sense dynamic manifestations including movement patterns, fluidity, hesitations, volume of the voice, amplitude and frequency modulations (e.g., jitter, shimmer rates, etc.) temperature fluctuations, increases or decreases in heart rate, heart rate variability, and level of sweat production for comparison utilizing logic of the wireless earpieces to generate one or more actions. Alerts may be played to the user indicating the status of the request (e.g., initiated, in process, pending, awaiting verification, approved, rejected, etc.).

FIG. 1 is a pictorial representation of a communication environment 100 in accordance with an illustrative embodiment. The wireless earpieces 102 may be configured to communicate with each other and with one or more wireless devices, such as a wireless device 104. The wireless earpieces 102 may be worn by a user 106 and are shown both as worn and separately from their positioning within the ears of the user 106 for purposes of visualization. A block diagram of the wireless earpieces 102 if further shown in FIG. 2 to further illustrate components and operation of the wireless earpieces 102.

In one embodiment, the wireless earpieces 102 include a frame 108 shaped to fit substantially within the ears of the user 106. The frame 108 is a support structure that at least partially encloses and houses the electronic components of the wireless earpieces 102. The frame 108 may be composed of a single structure or multiple structures that are interconnected. The frame 108 defines an extension 110 configured to fit substantially within the ear of the user 106. The extension 110 may house one or more speakers, ear-bone microphones, or vibration components for interacting with the user. The extension 110 may be removable covered by one or more sleeves. The sleeves may be changed to fit the size and shape of the user's ears. The sleeves may come in various sizes and have extremely tight tolerances to fit the user 106 and one or more other users that may utilize the wireless earpieces 102 during their expected lifecycle. In another embodiment, the sleeves may be custom built to support the interference fit utilized by the wireless earpieces 102 while also being comfortable while worn.

In one embodiment, the frame 108 or the extension 110 (or other portions of the wireless earpieces 102) may include sensors 112 for sensing pulse, blood oxygenation, temperature, voice characteristics, skin conduction, glucose levels, impacts, activity level, position, location, orientation, as well as any number of internal or external user biometrics. A first set of the sensors 112 may represent external sensors that may sense user gestures, contact, motions, fingerprints, and external conditions (e.g., temperature, humidity, pressure, etc.). A number of the sensors 112 may also be internally positioned within the wireless earpieces 102. For example, the sensors 112 may represent metallic contacts, optical interfaces, thermometers, or micro-delivery systems for receiving and delivering information. Small electrical charges may be sensed within the ear of the user 106 as well as passed through the sensors 112 to analyze the biometrics of the user 106 including pulse, skin conductivity, temperature, blood analysis, sweat levels, and so forth. Sensors 112 may also be utilized to provide a small electrical current which may be useful for alerting the user, stimulating blood flow, alleviating nausea, or so forth. It is to be further understood that where a set of wireless earpieces includes two earpieces (such as a left ear piece and a right earpiece), that different sensors and other components may be present at different earpieces. Thus, each earpiece need not perform all of the same functions. Similarly when the earpiece is a part of a headset or headphones, sensors and other components may also be placed within a band connecting the left and right earpieces.

In some applications, temporary adhesives or securing mechanisms (e.g., clamps, straps, lanyards, extenders, chargers, portable battery packs, etc.) may be utilized to ensure that the wireless earpieces 102 remain in the ears of the user 106 even during the most rigorous and physical activities. For example, the wireless earpieces 102 may be utilized during marathons, swimming, team sports, biking, hiking, parachuting, or so forth. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless device 104 or the wireless earpieces 102 may communicate directly or indirectly with one or more wired or wireless networks, such as a network 120. The wireless earpieces 102 may include logic for dynamically configuring components of the wireless earpieces 102, such as speakers and microphones, to the conditions of the communication environment 100.

The wireless earpieces 102 may determine their position with respect to each other as well as the wireless device 104. For example, position information for the wireless earpieces 102 and the wireless device 104 may determine proximity of the devices in the communication environment 100. For example, global positioning information, wireless triangulation, or signal strength/activity may be utilized to determine proximity and distance of the devices to each other in the communication environment 100. In one embodiment, the distance information may be utilized to determine whether the wireless earpieces 102 are both being worn (e.g., should be experiencing similar environmental conditions, noise, etc.) or whether a single wireless earpiece 102 is being worn.

In one embodiment, the wireless earpieces 102 and the corresponding sensors 112 (whether internal or external) may be configured to take a number of measurements or log information during normal usage. The sensor measurements may be utilized to extrapolate other measurements, factors, or conditions applicable to the user 106. For example, the sensors 112 may monitor the user's heartbeat or EKG to determine the user's unique pattern or characteristics. The user 106 or another party may configure the wireless earpieces 102 directly or through a connected device and app (e.g., mobile app with a graphical user interface) to store or share information, audio, images, and other data. Some examples of standard usage may include detecting and recording a heartbeat, setting a biometric for authentication of a request, setting noise thresholds and the associated speaker volume level or microphone sensitivity, setting a user specified gesture/input for performing an action (e.g., playing music, opening an application, providing an audio indication of biometric feedback, etc.), active participation in a conversation, listening to music, or so forth. As a result, the wireless earpieces 102 may be customized to unlock access to data and features of the wireless earpieces 102. A combination or sequence of biometrics and user input may be associated with specific requests. Thus, access to the various features, functions, and data of the wireless earpieces 102 may be partitioned and protected utilizing unique identifiers. Distinct user profiles and unlocking preferences may be utilized to ensure that multiple users may utilize the wireless earpieces 102 with data, functionality, and access for each user being completely secured.

The wireless earpieces 102 may reconfigure themselves during an initial set up process, during start up, during regular use, or in response to a user request. In one embodiment, each of the sensors 112 of the wireless earpieces 102 may perform baseline readings to determine which user is utilizing the wireless earpieces 102 and to adapt to communications environments 100 that may be quiet, slightly noise, loud, or anything in between. For example, the wireless earpieces 102 may determine which of a number of users associated with the wireless earpieces 102 or a guest is utilizing the wireless earpieces 102 and the applicable communications environment 100 (e.g., the user's home, train station, work out areas, office environment, mechanical shop, sports venue, etc.). In one embodiment, the wireless earpieces 102 may determine data, functions, and features that may be accessed based on the user, the user's authorization level, location, activity, and so forth. The components of the wireless earpieces 102, such as the speakers and microphones may then be self-adjusted based on the identified user and information associated with the communications environment 100.

The wireless earpieces 102 may include any number of sensors 112 and logic for measuring and determining user biometrics, such as pulse rate, skin conduction, blood oxygenation, temperature, calories expended, voice and audio output, position, and orientation (e.g., body, head, etc.). The sensors 112 may also determine the user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces 102. The user input may be measured by the wireless earpieces 102 and converted into internal commands (utilized by the wireless earpieces 102 themselves) or external commands that may be sent to one or more external devices, such as the wireless device 104, a tablet computer, or so forth. For example, the user 106 may create a first specific head motion and first voice command that when detected by the wireless earpieces 102 are utilized to automatically authorize a financial transaction, a first gesture and a second voice command may authorize the wireless earpieces 102 to communicate the user's heart rate and calories burned for the day, and the user's skin conductivity and a second gesture may authorize the wireless earpieces to dictate a text message or implement a phone call. Any number of user biometrics and user input may be utilized alone, or in combination to unlock partitioned data and functionality to effectively sandbox the wireless earpieces 102.

The wireless earpieces may communication with any number of other sensory devices in the communication environment 100 to measure information and data about the user 106 as well as the communication environment 100 itself. In one embodiment, the communication environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, NFMI, Z-Wave, ZigBee, Wi-Fi, ANT+ or other applicable magnetic or radio frequency signals. In one embodiment, the personal area network may move with the user 106.

In other embodiments, the communication environment 100 may include any number of devices, components, or so forth that may communicate with each other directly or indirectly through a wireless (or wired) connection, signal, or link. The communication environment 100 may include one or more networks and network components and devices represented by the network 120, such as routers, servers, signal extenders, intelligent network devices, computing devices, or so forth. In one embodiment, the network 120 of the communication environment 100 represents a personal area network as previously disclosed. The network 120 may also represent a number of different network types and service providers.

Communications within the communication environment 100 may occur through the network 120 or may occur directly between devices, such as the wireless earpieces 102 and the wireless device 104, or indirectly through a network, such as a Wi-Fi network. The network 120 may communicate with or include a wireless network, such as a Wi-Fi, cellular (e.g., 3G, 4G, 5G, PCS, GSM, etc.), Bluetooth, or other short range or long range radio frequency network. The network 120 may also include or communicate with any number of hard wired networks, such as local area networks, coaxial networks, fiber-optic networks, network adapters, or so forth. Communications within the communication environment 100 may be operated by one or more users, service providers (e.g., secure, public, private, etc.), or network providers.

The wireless earpieces 102 may play, communicate, or utilize any number of alerts or communications to indicate that the status of the access of the unlocking process. For example, one or more alerts may indicate when attempts are made to access protected information or functionality (e.g., a prompt to provide passwords or identifiers), unlocking is in process, additional user interaction is required (e.g., combinations of passwords, sequential verification, etc.), and/or access is available with unlocking completed with specific tones, verbal acknowledgements, tactile feedback, or other forms of communicated messages. For example, an alert may be played during each stage of the access and unlocking process. The corresponding alert may also be communicated to the user 106 and the wireless device 104.

In other embodiments, the wireless earpieces 102 may also vibrate, flash, play a tone or other sound, or give other indications of the access process status in order to prompt user actions (e.g., giving a sequence of verbal, motion, or gesture-based authentications, provide additional feedback, etc.) or implement any number of associated steps. The wireless earpieces 102 may also communicate an alert to the wireless device 104 that shows up as a notification, message, or other indicator indicating the necessity for configuration/re-configuration or a changed status of the configuration process, such as an audio alert that "the volume has been automatically adjusted for environmental noise."

The wireless earpieces 102 as well as the wireless device 104 may include logic for automatically implementing access and authorization in response to wireless earpiece set-up, start-up, condition changes (e.g., location, activities, etc.), event happenings, user requests or various other conditions and factors of the communication environment 100. For example, the wireless device 104 may communicate instructions received from the wireless earpieces 102 for the user 106 to provide user input and feedback to unlock the data, functions, and features. The wireless device 104 may include an application that displays instructions and information to the user 106 in response to authentication information being required.

In one embodiment, the wireless device 104 may utilize short-range or long-range wireless communications to communicate with the wireless earpieces 102 through a wireless signal or devices of the communication environment 100. For example, the wireless device 104 may include a Bluetooth and cellular transceiver within the embedded logical components. For example, the wireless signal may be a Bluetooth, Wi-Fi, Zigbee, Ant+, near-field magnetic induction (NFMI), or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, NFMI, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sensor data sent from the wireless earpieces 102. For example, the wireless device 104 may represent any number of android, iOS, Windows, open platforms, or other systems and devices. Similarly, the wireless device 104 or the wireless earpieces 102 may execute any number of applications that utilize the user input, proximity data, biometric data, and other feedback from the wireless earpieces 102 to initiate, authorize, or perform access associated tasks.

As noted, the layout of the internal components of the wireless earpieces 102 and the limited space available for a product of limited size may affect where the sensors 112 and other components may be positioned. The positions of the sensors 112 within each of the wireless earpieces 102 may vary based on the model, version, and iteration of the wireless earpiece design and manufacturing process.

Figure 2:
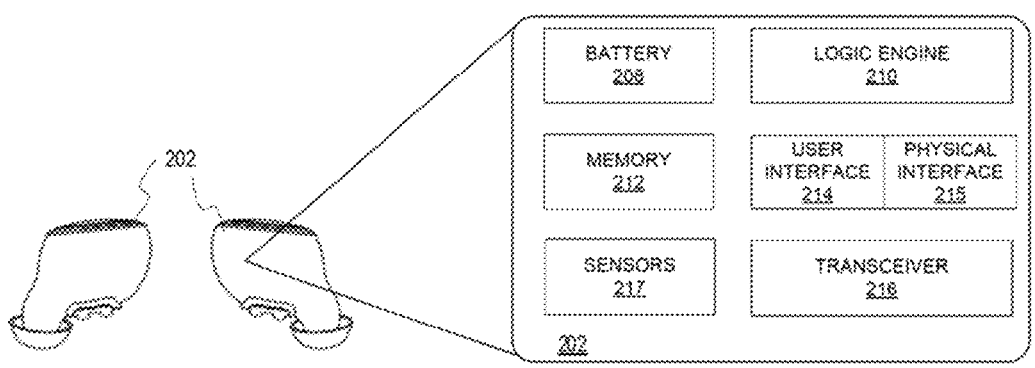
FIG. 2 is a block diagram of wireless earpieces in accordance with an illustrative embodiment.

FIG. 2 further illustrates a block diagram of the wireless earpieces 202. As noted, the components of the wireless earpieces 202 may be described collectively rather than individually. The wireless earpieces 202 may be wirelessly linked to any number of wireless devices, such as the wireless device 104 of FIG. 1. For example, wireless devices may include wearable devices, communications devices, computers, entertainment devices, vehicle systems, exercise equipment, or so forth. Sensor measurements, user input, and commands may be received from either the wireless earpieces 202 or the wireless device (not shown) for processing and implementation on either of the devices (or other externally connected devices). Reference to the wireless earpieces 202 may descriptively or functionally refer to either the pair of wireless earpieces (wireless earpieces) together or individual wireless earpieces (left wireless earpiece and right wireless earpiece) without limitation.

In some embodiments, the wireless device may also act as a logging tool for sensor data or measurements made by the wireless earpieces 202. For example, the wireless device may receive and share data captured by the wireless earpieces 202 in real-time including biometric information, such as authentication biometrics or input or status of the user (e.g., physical, emotional, etc.). As a result, the wireless device may be utilized to store, display, and synchronize sensor data received from the wireless earpieces 202. For example, the wireless device may display user pulse rate, temperature, proximity, location, blood oxygenation, distance, calories burned, and so forth as measured by the wireless earpieces 202. The user or a request may also be authenticated by sending the data to the wireless device that may then authenticate the data and authorize a request, function, feature, or so forth. The wireless device may be configured to receive and display alerts that indicate conditions to initiate, process, and authenticate a request have been met. For example, if a request is made and the wireless earpieces 202 may automatically display as an alert, message, or in-app communication, such as "please authenticate sending your work out data through your phone by text message." The wireless earpieces 202 and the wireless device may have any number of electrical configurations, shapes, and colors and may include various circuitry, connections, and other components utilized to perform the illustrative embodiments.

In one embodiment, the wireless earpieces 202 may include a battery 208, a logic engine 210, a memory 212, a user interface 214, a physical interface 215, a transceiver 216, and sensors 217. The wireless device may have any number of configurations and include components and features as are known in the art.

The battery 208 is a power storage device configured to power the wireless earpieces 202. In other embodiments, the battery 208 may represent a fuel cell, thermal electric generator, piezo electric charger, solar charger, ultra-capacitor, or other existing or developing power storage technologies. The sensors 217 may also be utilized to measure the temperature of the battery 208 and the condition of internal components of the wireless earpieces. The sensors 217 may also be utilized to determine data about internal and external conditions and factors applicable to the user, the user's environment, a communicating wireless device, or so forth. Other conditions and factors sensed by the sensors 217 (e.g., water/humidity, pressure, blood oxygenation, blood content levels, altitude, position, impact, radiation, etc.) may also be determined with the data being processed by the logic engine 210.

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize sensor measurements, user input, user preferences and settings, conditions, factors, and environmental conditions to determine the identity of the user, at least in part, from measurements performed by the wireless earpieces 202. This information may also be utilized to authenticate transactions. The wireless earpieces 202 may function separately or together to authenticate a transaction is allowed by an authorized user. For example, processing may be divided between the wireless earpieces 202 to increase the speed of processing and to load balance any processes being performed. For example, a left wireless earpiece may perform imaging of the user's ear to identify the user while the right wireless earpiece may identify voice characteristics of the wireless earpieces. Multiple forms of identifying information may be utilized to better secure transactions authenticated through the wireless earpieces.

In one embodiment, the logic engine 210 may perform the authentication determination based on measurements and data from the sensors 217. The logic engine 210 may also perform any number of mathematical functions (e.g. linear extrapolation, polynomial extrapolation, conic extrapolation, French curve extrapolation, polynomial interpretation) to determine or infer the identity of the user from the sensor measurements as well as determine whether a biometric identifier or password is verifiably received. The logic engine 210 may utilize time and other sensor measurements as causal forces to enhance a mathematical function utilized to perform the determinations, processing, and extrapolation performed by the logic engine 210.

The logic engine 210 may also process user input to determine access commands implemented by the wireless earpieces 202 or sent to the wireless earpieces 202 through the transceiver 216. Specific actions may be allowed based on sensor measurements, extrapolated measurements, environmental conditions, proximity thresholds, and so forth. For example, the logic engine 210 may implement an authentication macro allowing the user to automatically unlock a financial application utilizing a heartbeat pattern and voice command. In another embodiment, different types of actions may require different levels or combinations of biometric and user information. For example, low value data, such as work out data, may require a single piece of identifying information (e.g., ear mapping) whereas high value data, such as glucose levels, heart rate, and blood pressure may require three pieces of identifying information (e.g., skin conductivity, user specified gesture, user sign on to the wireless earpieces 202).

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 212 is a hardware element, device, or recording media configured to store data or instructions for subsequent retrieval or access at a later time. The memory 212 may represent static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the user, wireless earpieces 202, wireless device 204, and other peripherals, such as a wireless device, smart glasses, smart watch, smart case for the wireless earpieces 202, wearable device, and so forth. In one embodiment, the memory 212 may store, display, or communicate instructions, programs, drivers, or an operating system for controlling the user interface 214 including one or more LEDs or other light emitting components, speakers, tactile generators (e.g., vibrator), and so forth. The memory 212 may also store biometric readings, user input required for specified data, functions, or features, authentication settings and preferences, thresholds, conditions, signal or processing activity, historical information, proximity data, and so forth. The memory 212 may also store The transceiver 216 is a component comprising both a transmitter and receiver which may be combined and share common circuitry on a single housing. The transceiver 216 may communicate utilizing NFMI, Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. For example, the transceiver 216 may coordinate communications and actions between the wireless earpieces 202 utilizing NFMI communications. The transceiver 216 may also be a hybrid transceiver that supports a number of different communications. For example, the transceiver 216 may communicate with wireless devices or other systems utilizing wired interfaces (e.g., wires, traces, etc.), NFC, or Bluetooth communications. The transceiver 216 may also detect amplitudes and infer distance between the wireless earpieces 202 and external devices, such as the wireless device or a smart case of the wireless earpieces 202.

The components of the wireless earpieces 202 may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with wireless devices or other electrical components, devices, or systems.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of a wireless device. In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. For example, the user interface 214 may include a touch screen, one or more cameras or image sensors, microphones, speakers, and so forth. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the wireless device. For example, the user may turn on, reactivate, or provide feedback utilizing the user interface 214.

In one embodiment, the user interface 214 may include a fingerprint scanner that may be utilized to scan a fingerprint (e.g., the index finger) of a user to authenticate a transaction. The user interface 214 of each of the wireless earpieces 202 may store identifying information for one or more fingers. In one embodiment, the biometric data of the user may be encrypted and stored within a secure portion of the memory 212 to prevent unwanted access or hacking. The wireless earpieces 202 may also store important biometric data, such as medical information (e.g., medical conditions, allergies, logged biometrics, contacts, etc.) that may be shared in response to an emergency.

In one embodiment, the user may provide user feedback for authenticating a request by tapping the user interface 214 once, twice, three times, or any number of times (e.g., sequentially or in a timed pattern). Similarly, a swiping motion may be utilized across or in front of the user interface 214 (e.g., the exterior surface of the wireless earpieces 202) to implement a predefined action. Swiping motions in any number of directions or gestures may be associated with specific requests as well as other activities, such as share exercise data, share music playlist, enable a dictation feature, open a specified app, share user vitals, play music, pause, fast forward, rewind, activate a digital assistant (e.g., Siri, Cortana, smart assistant, etc.), or so forth without limitation. The swiping motions may also be utilized to control actions and functionality of wireless devices or other external devices (e.g., smart television, camera array, smart watch, etc.). The user may also provide user input for authorizing an action or request by moving his head in a particular direction or motion or based on the user's position or location. For example, the user may utilize voice commands, head gestures, or touch commands to change the content displayed by a wireless device as received from the wireless earpieces 202. The user interface 214 may also provide a software interface including any number of icons, soft buttons, windows, links, graphical display elements, and so forth for receiving user input.

In one embodiment, the user interface 214 may periodically utilize one or more microphones and speakers of the wireless earpieces to authenticate the user. The microphone of the user interface 214 may measure various voice characteristics including amplitude, shimmer rates (i.e., changes in amplitude over time) frequency/pitch, jitter rates (i.e., changes in frequency data over time), accent, voice speed, inflection, and so forth. Specific words, phrases, or sounds may be associated with actions as stored in the memory 212 and detected by one or more microphones of the user interface 214. The microphones may include external microphones positioned on the outside surface(s) of the wireless earpieces 202 (e.g., air microphones) as well as internal microphones (e.g., bone, ear-bone microphones, etc.). The wireless earpieces 202 may also recognize a pre-defined vocabulary. For example, specific words may be required to authenticate different requests and action types.

The sensors 217 may include inertial sensors, pulse oximeters, accelerometers, gyroscopes, magnetometers, water, moisture, or humidity detectors, impact/force detectors, thermometers, photo detectors, miniature cameras, microphones, and other similar instruments for identifying the user and reading biometrics as well as location, utilization of the wireless earpieces 202, orientation, motion, and so forth. The sensors 217 may also be utilized to determine the biometric, activity, location, and speed measurements of the user. In one embodiment, the sensors 217 may store data that may be shared with other components (e.g., logic engine 210 authenticating a transaction), users, and devices.

The sensors 217 may include photodetectors, ultrasonic mapping devices, or radar that scan the ear of the user when positioned for utilization. The sensors 217 may generate a two or three dimensional scan or topography map of the user's ear and surrounding areas when the wireless earpieces 202 are properly positioned. The mapping may include the internal and/or external portions of the user's ear. The topographical image of the user's ear may be utilized as a stand-alone biometric identifier or may be utilized with other biometric identifiers to identify the user. The image may include the external auditory meatus, scapha, fossa triangularis, scaphoid fossa, helix, antihelix, antitragus, lobule, the tragus, and pinna as well as other internal or external portions of the ear and surrounding head structure.

Externally connected wireless devices may include components similar in structure and functionality to those shown for the wireless earpieces 202. For example, a wireless device may include any number of processors, batteries, memories, busses, motherboards, chips, transceivers, peripherals, sensors, displays, cards, ports, adapters, interconnects, sensors, and so forth. In one embodiment, the wireless device may include one or more processors and memories for storing instructions. The instructions may be executed as part of an operating system, application, browser, or so forth to implement the features herein described. For example, the user may set preferences for the wireless earpieces 202 to work individually or jointly to identify user biometrics for comparison against known values to verify the user is authorized to perform a transaction. Likewise, the preferences may manage the actions taken by the wireless earpieces 202 in response to identifying specific users are utilizing the wireless earpieces 202. For example, a parent user may have full access to perform any number of transactions, but a juvenile user may only have access to perform transactions at designated locations (e.g., coffee shops, cafeterias, fast food restaurants, etc.) or for designated amounts (e.g., less than $20). In one embodiment, the wireless earpieces 202 may be magnetically or physically coupled to the wireless device to be recharged or synchronized.

The wireless device may also execute an application with settings or conditions for updating, synchronizing, sharing, saving, processing transactions and utilizing biometric information. For example, one of the sensors 217 that may have failed may be ignored in response to improper or unreliable data being gathered. As a result, the user identification process for performing authorizations may be dynamically performed utilizing any combination of sensor measurements. For example, the number and position of the sensors 217 utilized to perform status determinations for the user may vary based on failures, inaccurate data, or other temporary or permanent issues with hardware and software of the wireless earpieces 202.

Figure 3:
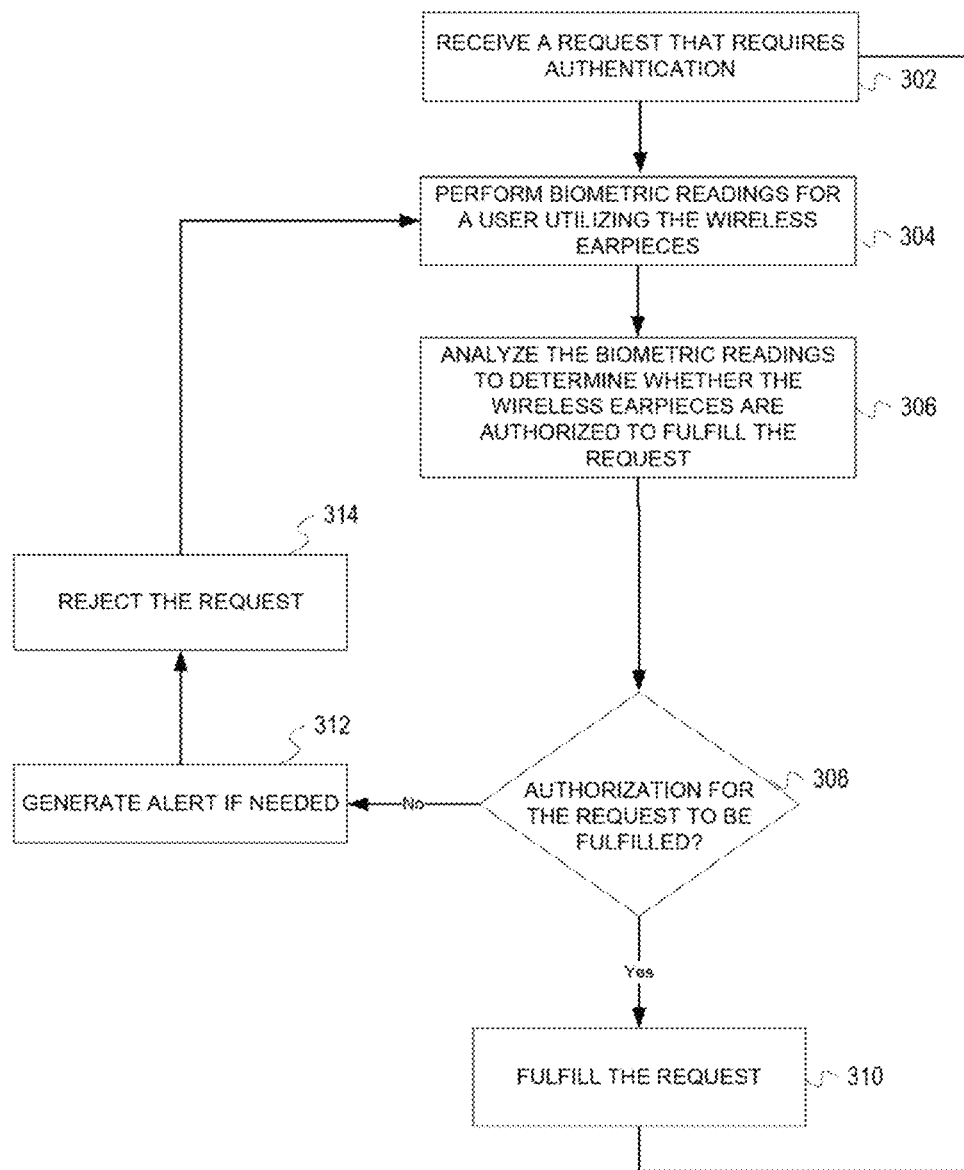
FIG. 3 is a flowchart of a process for authenticating a request in accordance with an illustrative embodiment.

FIG. 3 is a flowchart of a process for authenticating a request in accordance with an illustrative embodiment. In one embodiment, the process of FIG. 3 may be implemented by one or more wireless earpieces, such as the wireless earpieces 102 of FIG. 1. For example, the method of FIG. 3 may be performed for both of the wireless earpieces as a pair/set or for each of wireless earpieces individually to process a request. In one embodiment, the biometric readings and user input may include one or more of pulse, hand gestures, designated motions, voice amplitude, voice frequency, skin conductivity, vocabulary, blood oxygenation, temperature, heart beat pattern, ear map, calories expended per time period, sweat levels, orientation, position, and so forth. The method of FIG. 3 may be performed to authorize a request. For example, the existing sensors of the wireless earpieces may be utilized to authorize a specific feature, function, action, and/or data access (e.g., data storage, data, retrieval, data communication to an external device, etc.). The process of FIG. 3 may be performed by one or more of the wireless earpieces and one or more wireless devices (e.g., cell phone, tablet, gaming device, smart card, etc.).

The process may begin with the wireless earpieces receiving a request that requires authentication (step 302). In one embodiment, the request may be automatically generated based on circumstances, conditions, or user actions. For example, the wireless earpiece may detect a wireless device linked with the wireless earpieces and may be prompted to synchronize health data once authorized by the user. The request may also be received in response to a user request (e.g., share my work out data with John, open my bank app, etc.). The user may also preprogram a specified voice command, gesture, head motion, or other input that may be sensed by the wireless earpieces. In one embodiment the request may require a combination or simultaneous reading of various user inputs and biometrics to authorize the request. In one embodiment, the request may be initiated and processed entirely utilizing the wireless earpieces. In another embodiment, the request may be received from a wireless device, such as a cell phone, and communication with the wireless earpieces. The request may provide information that the wireless device requires the biometric reading or other user input to authenticate a specified feature, function, action, data, or so forth. For example, the request may be played as an audio or tactile alert to the wireless earpieces. In one embodiment, one or more applications or other software interfaces of both the wireless device and the wireless earpieces may interact to perform the communications of FIG. 3.

Next, the wireless earpieces perform biometric readings for a user utilizing the wireless earpieces (step 304). The sensor locations and types of sensors within the wireless earpieces may vary. The sensors may generate a number of biometric readings that may be utilized individually or compiled to subsequently identify the user and specific biometric factors. The sensors may include one or more inertial sensors, temperature sensors, heart pulse rate sensors, skin conductivity sensors, and microphones (i.e., analyzing the user's voice). The sensors may measure data or information that may be utilized to determine or imply the user's identity as herein described. The sensor may utilize any number of sampling rates or time periods for performing the sensor measurements. For example, the sensors may identify the user from the moment the wireless earpieces or placed in the ears of the user such that any potential requests may be automatically authenticated as belonging to the authorized user. The biometric readings may also be performed in response to receiving the request described in step 302. In another embodiment, the biometric readings may represent user input purposely provided by the user as part of the transaction process, such as gestures, motions, verbal commands, posing, sounds, and so forth. The specified user input or baseline readings for the biometric readings may have been previously entered, saved, or logged for utilization as part of the transaction process. For example, the wireless earpieces may store user preferences and access information that specify the type, order, and accuracy of biometric information and user input required to perform authentication.

Next, the wireless earpieces analyze the biometric readings to determine whether the wireless earpieces are authorized to fulfill the request (step 306). The biometric readings or other user input may be analyzed for accuracy statistical significance, and so forth. For example, the biometric readings may be compared against default, baseline, or standard biometric readings for the user to ensure accuracy in identifying the user or required identifier. Likewise, user input that may be received for verification purposes may be compared against pre-established or trained data. The wireless earpieces may also perform biasing or error correction as needed during step 304 to ensure the sensor measurements are accurate. For example, if a sensor from one of the wireless earpieces is experience incorrect or inaccurate data, the data from that sensor may be disregarded for purposes of performing analysis. The sensor measurements may be run through any number of computations utilizing the processor of one of the wireless earpieces. In one embodiment, a number of biometric readings and/or user input may be required to be received sequentially, simultaneously, or concurrently.

Next, the wireless earpieces determine whether there is authorization for the request to be fulfilled (step 308). The identity of the user may be determined utilizing the biometric readings. In one embodiment, a number of different users may utilize the wireless earpieces at any given time. For example, each of the different users may have distinct personal information, security settings, permissions, applications and preferences that may be utilized by the user. During step 306, the wireless earpieces may ensure that all security measures, conditions, thresholds, and information are provided and authenticated to perform the transaction. For example, requests for personal data to be shared by User A may be performed in response to a voice confirmation and gesture confirmation confirmed through the wireless earpieces. In another example, a request to open a financial application by User B may be performed in response to the wireless earpieces being securely linked with wireless device B and the user tapping the right wireless earpiece twice in a row. In yet another example, sending personal data by User C may be performed in response to a skin conductivity, a verbal pin number, and ear mapping.

If the authorization is granted for the request to be fulfilled during step 308, the wireless earpieces fulfill the transaction (step 310). During step 310 the request may be fulfilled by accessing or sending data, opening an application, enabling a feature, or performing other specified functionality of the wireless earpieces. In another embodiment, the request may be fulfilled by a wireless device in communication with the wireless earpieces. During step 310 the wireless earpieces may fulfill the request directly or indirectly.

If the authorization is not granted during step 308, the wireless earpiece generates an alert if needed (step 312). The alert may be generated in any number of ways. In one embodiment, the alert is an internal alert that may be communicated to the user of the wireless device. For example, the alert may be communicated to the user as an audio, tactile, or visual alert, such as "the data was not released due to improper identification, biometrics, or password", or "the selected app cannot be opened." The alert may also be communicated to a wireless device in communication with the wireless earpiece. For example, an alert may be sent to a cell phone in communication with the wireless earpiece to display an application specific alert to the user, such as "this feature is not available due to improper authorization." In some embodiments, the alert may be sent through email, text message, or other designated communications technique in the event that the wireless earpieces are being utilized by an unauthorized party. In other embodiments, no alert may be generated.

Next, the wireless earpieces reject the request (step 314). The rejection may be a default response to determining the user is not authorized to perform the transaction. The rejection may ensure the proper verifications are performed before fulfilling a request. As a result, the wireless earpieces are more secure and may be shared between multiple users while still securing data and access to features and functionality of the wireless earpieces. The process of FIG. 3 may allow the user to automatically secure access to the data, features, and functions of the wireless earpieces.

The illustrative embodiments provide a system, method, and wireless earpiece(s) for managing access to the data, features, and functions of the wireless earpieces. The described process may be utilized in combination with various features, functions, methods, systems, devices, components, or claim sets of the wireless earpieces or as separately described. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 4:
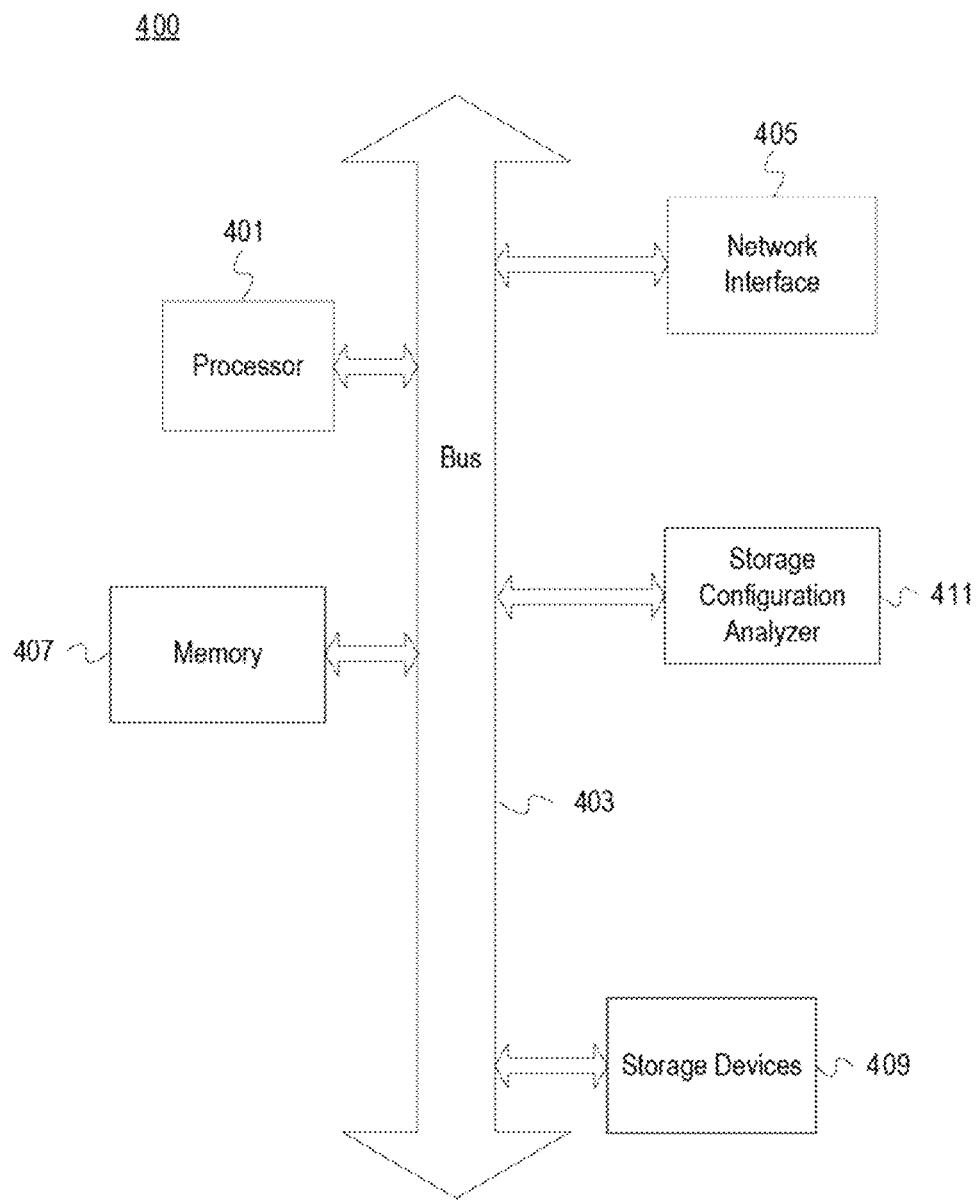
FIG. 4 depicts a computing system in accordance with an illustrative embodiment.

FIG. 4 depicts a computing system 400 in accordance with an illustrative embodiment. For example, the computing system 400 may represent a device, such as the wireless device 104 of FIG. 1. The computing device 400 may be utilized to receive user settings, instructions, or feedback for controlling the power management features of the wireless earpieces together and separately. The computing system 400 includes a processor unit 401 (possibly including multiple processors, multiple cores, multiple nodes, and/or implementing multi-threading, etc.). The computing system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate retrieval of the audio information associated with an identifier. Code may be implemented in any of the other devices of the computing system 400. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for authenticating functionality of a pair of wireless earpieces, the method comprising:
   receiving a request to perform an action from a user of the pair of wireless earpieces, wherein the action requires authentication through the pair of wireless earpieces;
   determining by the pair of wireless earpieces a level of authentication based upon the action, wherein the level of authentication requires a password input by the user;
   prompting by the pair of wireless earpieces to the user to provide a password for authorization;
   receiving a password specified by the user from the user through the pair of wireless earpieces;
   performing at least one biometric reading for the user utilizing sensors of the pair of wireless earpieces, wherein a number of types of the at least one biometric readings is determined by the level of authentication;
   analyzing the password and the at least one biometric reading by the pair of wireless earpieces to determine whether the user is authorized for the pair of wireless earpieces to fulfill the request; and
   authenticating the request after determining the user is authorized for the pair of wireless earpieces to fulfill the request;
   wherein the at least one biometric reading includes at least one of a pulse rate, a heartbeat pattern, a blood oxygenation, a temperature, and skin conduction.

2. The method of claim 1, wherein the request is associated with information securely stored by the pair of wireless earpieces.

3. The method of claim 1, wherein the at least one biometric reading is automatically performed in response to the pair of wireless earpieces being worn by the user to immediately authenticate the request when received.

4. The method of claim 1, wherein the request is automatically generated in response to a user action utilizing the pair of wireless earpieces.

5. The method of claim 1, further comprising:
   fulfilling the request in response to the authenticating the request.

6. The method of claim 1, further comprising biasing the at least one biometric reading in response to a determination that the at least one biometric reading from the sensors is inaccurate.

7. The method of claim 1, wherein the receipt of the password and the performance of the at least one biometric reading is performed in a specific order defined by the user.

8. A wireless earpiece comprising:
   a processor for executing a set of instructions; and
   a memory for storing the set of instructions, wherein the set of instructions are executed to:
      receive a request to perform an action from a user wherein the action requires authentication through the wireless earpiece;
      determine a level of authentication based upon the action at a logic engine of the wireless earpiece, wherein the level of authentication requires at least two biometric readings;
      perform at least two biometric readings for a user utilizing sensors of the wireless earpiece, wherein the sensors include a plurality of sensor types;
      analyze the at least two biometric readings to determine whether the user is authorized for the wireless earpiece to fulfill the request; and
      authenticate the request in response to determining the at least two biometric readings performed by the wireless earpiece authorize fulfillment of the request;
      wherein the at least one two biometric readings include at least two of a pulse rate, a heartbeat pattern, a blood oxygenation, a temperature, and skin conduction.

9. The wireless earpiece of claim 8, wherein the request is received from a wireless device associated with the wireless earpiece.

10. The wireless earpiece of claim 8, wherein the set of instructions are further executed to:
    reject the request in response to determining the at least two biometric readings do not authorize the wireless earpiece to fulfill the request.

11. The wireless earpiece of claim 8, wherein the request is associated with information securely stored by the wireless earpiece.

12. The wireless earpiece of claim 8, wherein the wireless earpiece is one of a pair of wireless earpieces worn in ears of the user.

13. The wireless earpiece of claim 8, wherein the set of instructions are further executed to:
    fulfill the request in response to the authenticating the request.

14. The wireless earpiece of claim 8, wherein the set of instructions are further executed to:
    play an alert to the user regarding a status of the request.

15. The wireless earpiece of claim 8, wherein the request is associated with personal health data of the user and in response to the request, performing an extra biometric reading for the user utilizing the sensors of the wireless earpiece.

16. The wireless earpiece of claim 8, wherein each biometric reading is performed using a different sensor of the plurality of sensor types.

17. The wireless earpiece of claim 8, wherein the performance of the at least two biometric readings are performed in a specific order defined by the user.

18. A wireless earpiece, comprising:
- a frame for fitting in an ear of a user;
- a logic engine controlling functionality of the wireless earpiece; and
- a plurality of sensors performing a plurality of biometric readings of the user, wherein each biometric reading is associated with a different unique characteristic of the user and at least one different unique characteristic of the user is specifically associated with a request to perform an action from a user of the wireless earpieces
- wherein the logic engine receives the request that requires authentication through the wireless earpiece, determines a level of authentication based upon the action wherein a number of types of the at least two biometric readings is determined by the level of authentication, authenticates the request in response to determining the plurality of biometric readings performed by the wireless earpiece to authorize fulfillment of the request, and fulfills the request in response to the authenticating the request; and
- wherein the plurality of biometric readings include at least two of a pulse rate, a heartbeat pattern, a blood oxygenation, a temperature, and skin conduction.

19. The wireless earpiece of claim 18, wherein the wireless earpiece is one of a pair of wireless earpieces worn in-ear.

20. The wireless earpiece of claim 18, wherein the plurality of biometric readings comprises a sequence of biometric readings associated with a secondary user, wherein the sequence of biometric readings unlocks a user profile associated with the secondary user.

* * * * *